United States Patent
Koga et al.

(10) Patent No.: US 6,790,266 B2
(45) Date of Patent: Sep. 14, 2004

(54) WATER BASE INK SET FOR INK-JET RECORDING

(75) Inventors: Narumi Koga, Nagoya (JP); Kazuma Goto, Nagoya (JP); Naomichi Kobayashi, Nagoya (JP); Michiko Aoyama, Nagoya (JP); Shunichi Higashiyama, Yotsukaichi (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 11 days.

(21) Appl. No.: 10/103,746

(22) Filed: Mar. 25, 2002

(65) Prior Publication Data

US 2002/0185034 A1 Dec. 12, 2002

(30) Foreign Application Priority Data

Mar. 29, 2001 (JP) ........................................ 2001-097016

(51) Int. Cl.$^7$ ............................................... C09D 11/02
(52) U.S. Cl. ................. 106/31.27; 106/31.6; 106/31.58; 106/31.86
(58) Field of Search ........................... 106/31.27, 31.58, 106/31.6, 31.86

(56) References Cited

U.S. PATENT DOCUMENTS

| | | | | |
|---|---|---|---|---|
| 5,207,824 A | * | 5/1993 | Moffatt et al. ............ | 106/31.58 |
| 5,700,317 A | * | 12/1997 | Adamic ...................... | 106/31.58 |
| 5,888,284 A | * | 3/1999 | Engel ......................... | 106/31.27 |
| 5,948,154 A | * | 9/1999 | Hayashi et al. ............ | 106/31.48 |
| 6,234,601 B1 | * | 5/2001 | Hayashi et al. ............ | 347/16 |
| 6,274,645 B1 | * | 8/2001 | Gundlach et al. .......... | 523/160 |
| 6,379,441 B1 | * | 4/2002 | Kanaya et al. ............. | 106/31.49 |
| 6,436,179 B1 | * | 8/2002 | Hiraoka et al. ............ | 106/31.58 |
| 6,500,248 B1 | * | 12/2002 | Hayashi ..................... | 106/31.86 |
| 6,521,034 B1 | * | 2/2003 | Osumi et al. ............... | 106/31.6 |
| 6,540,329 B1 | * | 4/2003 | Kaneko et al. ............. | 347/43 |
| 2002/0050225 A1 | * | 5/2002 | Mafune et al. ............. | 106/31.27 |
| 2002/0060721 A1 | * | 5/2002 | Takada et al. .............. | 347/57 |
| 2002/0093557 A1 | * | 7/2002 | Takuhara et al. ........... | 347/100 |

* cited by examiner

Primary Examiner—Mark L. Bell
Assistant Examiner—Veronica F. Faison
(74) Attorney, Agent, or Firm—Oliff & Berridge, PLC

(57) ABSTRACT

An ink set for ink-jet recording comprises a yellow ink, a magenta ink, and a cyan ink. Changes of colors $\Delta E_Y$, $\Delta E_M$, $\Delta E_C$ of the yellow ink, the magenta ink, and the cyan ink satisfy the following relationship when the yellow ink, the magenta ink, and the cyan ink are deposited on regular paper, followed by being irradiated with light having a wavelength of 300 nm to 400 nm and an illuminance of 100 W/m$^2$ for 30 hours by using a xenon lamp:

$$|\Delta E_Y - \Delta E_M| \leq 5, |\Delta E_M - \Delta E_C| \leq 5, |\Delta E_C - \Delta E_Y| \leq 5.$$

The ink set is excellent in color balance after the fading.

5 Claims, 1 Drawing Sheet

WATER BASE INK SET FOR INK-JET RECORDING

BACKGROUND OF THE INVENTION

1. Field of the Invention

The present invention relates to a water base ink set for ink-jet recording to perform the color ink-jet recording.

2. Description of the Related Art

The ink-jet recording method adopts a variety of ink discharge methods including, for example, the electrostatic attraction method, the method in which mechanical vibration or displacement is applied to the ink by using a piezoelectric element, and the method in which bubbles are generated by heating the ink to utilize the pressure generated thereby. Ink droplets are formed by means of the discharge method as described above, and all or a part of the droplets are adhered to a recording objective to perform the recording.

Those hitherto known and used as the ink to be employed for the ink-jet recording method as described above include those in which a variety of water-soluble dyes or pigments are dissolved or dispersed in liquid media each comprising water or a combination of water and water-soluble organic solvent.

As the printer based on the ink-jet system comes into widespread use, the printer is used to record picture images or the like, for example, in ordinary homes. In such circumstances, coloring agents, which enhance the light resistance of the ink, are used in order to hardly cause the changes of colors even after storage for a long term.

However, the conventional technique has involved the following problem.

In the conventional technique, attention has been paid to enhance the light resistance of each of the colors. The light resistance has differed among the respective colors, and the color balance among the color has not been maintained after the fading. For example, the time-dependent changes of colors, which are caused by the light after recording an image of a red apple, advance as follows. The red color is formed by the yellow ink and the magenta ink. When the light resistance of the yellow ink is extremely inferior to the light resistance of the magenta ink, only the color of magenta remains on the recording material. The image of the apple, which has been red, is changed into an apple of magenta color, making an unnatural impression.

SUMMARY OF THE INVENTION

The present invention has been made in order to solve the conventional problem as described above, an object of which is to provide a water base ink set for ink-jet recording with which the color balance is adjusted by uniformalizing the light resistances of respective color inks, and the color balance is also maintained for an image after the fading.

According to the present invention, there is provided an ink set for ink-jet recording comprising:

a yellow ink, a magenta ink, and a cyan ink, wherein: changes of colors $\Delta E_Y$, $\Delta E_M$, $\Delta E_C$ of the yellow ink, the magenta ink, and the cyan ink satisfy the following relationship when the yellow ink, the magenta ink, and the cyan ink are deposited on regular paper, followed by being irradiated with light having a wavelength of 300 nm to 400 nm and an illuminance of 100 W/m$^2$ for 30 hours by using a xenon lamp:

$|\Delta E_Y - \Delta E_M| \leq 5$, $|\Delta E_M - \Delta E_C| \leq 5$, $|\Delta E_C - \Delta E_Y| \leq 5$.

The ink set may be in a form of an ink cartridge having compartments which accommodate the yellow ink, the magenta ink, and the cyan ink respectively.

The water base ink set for ink-jet recording of the present invention comprises at least the yellow ink, the magenta ink, and the cyan ink.

Each of the yellow ink, the magenta ink, and the cyan ink includes, for example, those composed of water, a moistening agent, and a coloring agent.

The water is not specifically limited. However, it is preferable to use water having high purity such as ion exchange water and distilled water excluding, for example, tap water. The blending amount of the water may be determined depending on the type and the composition of the moistening agent and the coloring agent or the characteristics of the desired ink. However, in general, it is preferable that the blending amount is 10 to 98% by weight with respect to the total weight of the ink. If the blending amount is less than 10% by weight, or if the blending amount exceeds 98% by weight, then it is difficult that the viscosity of the ink in the ordinary state is maintained to be a viscosity at which the ink can be normally jetted. The blending amount is more preferably 30 to 97% by weight, and much more preferably 40 to 95% by weight.

The moistening agent is not specifically limited. For example, it is possible to use glycol ethers or the like represented by compounds based on ethylene glycol and propylene glycol and alkyl ethers thereof.

The moistening agent based on ethylene glycol includes, for example, ethylene glycol, diethylene glycol, triethylene glycol, polyethylene glycol, ethylene glycol-n-methyl ether, ethylene glycol-n-ethyl ether, ethylene glycol-n-propyl ether, ethylene glycol-n-butyl ether, ethylene glycol-n-isobutyl ether, diethylene glycol-n-methyl ether, diethylene glycol-n-ethyl ether, diethylene glycol-n-propyl ether, diethylene glycol-n-butyl ether, diethylene glycol-n-isobutyl ether, triethylene glycol-n-methyl ether, triethylene glycol-n-ethyl ether, triethylene glycol-n-propyl ether, triethylene glycol-n-butyl ether, and triethylene glycol-n-isobutyl ether.

The moistening agent based on propylene glycol includes, for example, propylene glycol, dipropylene glycol, tripropylene glycol, polypropylene glycol, propylene glycol-n-methyl ether, propylene glycol-n-ethyl ether, propylene glycol-n-propyl ether, propylene glycol-n-isopropyl ether, propylene glycol-n-butyl ether, dipropylene glycol-n-methyl ether, dipropylene glycol-n-ethyl ether, dipropylene glycol-n-propyl ether, dipropylene glycol-n-isopropyl ether, dipropylene glycol-n-butyl ether, tripropylene glycol-n-methyl ether, tripropylene glycol-n-ethyl ether, tripropylene glycol-n-propyl ether, tripropylene glycol-n-isopropyl ether, and tripropylene glycol-n-butyl ether.

Other than the above, the moistening agent includes, for example, polyhydric alcohol such as 1,3-butanediol, 1,5-pentanediol, 1,6-hexanediol, glycerol, 1,2,6-hexanetriol, 1,2,4-butanetriol, 1,2,3-butanetriol, and pentanetriol; nitrogen-containing heterocyclic compound such as N-methyl-2-pyrrolidone, N-hydroxyethyl-2-pyrrolidone, 2-pyrrolidone, 1,3-dimethylimidazolidinone, and ε-caprolactam; amide such as formamide, N-methylformamide, and N,N-dimethylformamide; amine such as monoethanolamine, diethanolamine, triethanolamine, monoethylamine, diethylamine, and triethylamine; and sulfur-containing compound such as dimethylsulfoxide, sulfolane, and thiodiethanol.

Each of the moistening agents as described above may be used singly, or two or more of them may be used in combination.

In general, the blending amount of the moistening agent as described above is preferably 1 to 80% by weight with respect to the total weight of the ink. If the blending amount is less than 1% by weight, it is impossible to obtain the effect of addition of the moistening agent. If the blending amount exceeds 80% by weight, for example, problems arise in some cases such that the viscosity of the ink is unnecessarily increased to make it impossible to discharge the ink, or the ink is dried extremely slowly on the recording paper. More preferably, the blending amount is 3 to 60% by weight, and much more preferably 5 to 50% by weight.

Those usable as the coloring agent include, for example, water-soluble dyes represented by direct dye, acidic dye, basic dye, and reactive dye.

Further, for example, those preferably used as the water-soluble dye include those classified, for example, into azo dye, metal complex salt dye, naphthol dye, anthraquinone dye, indigo dye, carbonium dye, quinoneimine dye, xanthene dye, aniline dye, quinoline dye, nitro dye, nitroso dye, benzoquinone dye, naphthoquinone dye, phthalocyanine dye, and metal phthalocyanine dye.

It is preferable that the ink to be used for the ink-jet recording system satisfies required performance such as vividness, water solubility, stability, light resistance, and other required performance. Therefore, the coloring agent to be used is selected from those which satisfy the requirements as described above.

The direct dye includes, for example, C. I. Direct Yellow 12, 24, 26, 27, 28, 33, 39, 58, 86, 98, 100, 132, 142; C. I. Direct Orange 34, 39, 44, 46, 60; C. I. Direct Red 4, 17, 28, 37, 63, 75, 79, 80, 83, 99, 220, 224, 227; C. I. Direct Violet 47, 48, 51, 90, 94; C. I. Direct Brown 109; C. I. Direct Green 59; and C. I. Direct Blue 1, 6, 8, 15, 25, 22, 25, 71, 76, 80, 86, 90, 106, 108, 123, 163, 165, 199, 226.

The acidic dye includes, for example, C. I. Acid Yellow 3, 11, 17, 19, 23, 25, 29, 38, 42, 49, 59, 61, 71, 72; C. I. Acid Orange 7, 19; C. I. Acid Red 1, 6, 8, 17, 32, 35, 37, 42, 51, 52, 57, 80, 85, 87, 92, 94, 115, 119, 131, 133, 134, 154, 181, 186, 249, 254, 256, 289, 315, 317; C. I. Acid Violet 10, 34, 49, 75; and C. I. Acid Blue 9, 22, 29, 40, 59, 62, 93, 102, 104, 113, 117, 120, 167, 175, 183, 229, 234.

The basic dye includes, for example, C. I. Basic Red 1, 2, 9, 12, 13, 14, 37; C. I. Basic Violet 7, 14, 27; and C. I. Basic Blue 1, 3, 5, 7, 9, 24, 25, 26, 28, 29.

The reactive dye includes, for example, C. I. Reactive Yellow 2; C. I. Reactive Red 4, 23, 24, 31, 56; and C. I. Reactive Blue 7, 13.

It is preferable that the coloring agent is blended in an amount of 0.1 to 15% by weight with respect to the total weight of the ink. If the blending amount is less than 0.1% by weight, then the speed of fading of the ink is suddenly quickened on the recording paper, and the color balance is not maintained in some cases. On the other hand, if the blending amount exceeds 15% by weight, a problem sometimes arises such that the coloring agent is deposited in the ink. The blending amount is more preferably 0.3 to 10% by weight, and much more preferably 0.5 to 5.0% by weight.

The coloring agent, which has been contained in the conventional recording ink, has been selected and used so that the light resistance is excellent as far as possible for each of the colors. However, in general, the coloring agents of yellow and cyan are excellent in light resistance, and the coloring agent of magenta is inferior in light resistance. Therefore, the light resistance has greatly differed among the yellow ink, the magenta ink, and the cyan ink. For this reason, when an image is recorded on the regular paper, then the color balance among the colors has not been maintained after the fading, and the image has been changed into an unnatural image in which the yellow and blue colors are intense and the red color is exhausted or worn out.

Those in which the light resistances on the recording paper are uniform for the yellow ink, the magenta ink, and the cyan ink are preferably used for the coloring agents which are contained in the inks for constructing the water base ink set for ink-jet recording of the present invention. That is, the coloring agents are selected so that the relationships of $|\Delta E_Y - \Delta E_M| \leq 5$, $|\Delta E_M - \Delta E_C| \leq 5$, $|\Delta E_C - \Delta E_Y| \leq 5$ are established. Preferably, the coloring agents are selected so that $5 \leq \Delta E_Y \leq 10$, $5 \leq \Delta E_M \leq 10$, $5 \leq \Delta E_C \leq 10$ are satisfied.

In general, the light resistance of the coloring agent of magenta is inferior. Therefore, in the present invention, the coloring agents having good light resistances among the coloring agents of yellow and cyan can be used by mixing them with the coloring agents having low light resistances in order to uniformalize the light resistances. When the light resistances are made uniform among the yellow ink, the magenta ink, and the cyan ink, an image recorded on the regular paper is maintained with good color balance even after the fading.

originally, the direct dye as described above is the anionic dye for dyeing cellulose fibers. The direct dye is classified, for example, into those of azo, stilbene, thiazole, dioxazine, and phthalocyanine depending on the chemical structure. However, almost all of the direct dyes are azo dyes. Especially, those having excellent light resistances are phthalocyanine and dioxazine dyes.

The acidic dye is utilized to dye polyamide-based fibers such as wool, nylon, and silk. The acidic dye is classified, for example, into those of azo, anthraquinone, triphenylmethane, and xanthene depending on the chemical structure. The light resistance of the anthraquinone-based dye is good. However, the light resistances of the triphenylmethane-based and xanthene-based dyes are inferior.

The light resistance of the basic dye is generally inferior.

The reactive dye has, in the dye molecule, a reactive group to react with a hydroxyl group or an amino group. The reactive dye dyes the fiber by reacting with the hydroxyl group or the amino group in the fiber to form covalent bond. The reactive dye is dominantly used for cellulose, and it has good light resistance.

According to the fact described above, in general, the direct dye and the reactive dye have relatively good light resistances, and the acidic dye and the basic dye have relatively inferior light resistances. In the present invention, the light resistance of the color ink can be controlled by combining those having good light resistances and those having inferior light resistances.

Additionally, each of the inks for constructing the water base ink set for ink-jet recording of the present invention may optionally contain, for example, hitherto known various types of dispersing agents, surfactants, viscosity-adjusting agents, surface tension-adjusting agents, pH-adjusting agents, antiseptic agents, and fungicides. Inks of other colors such as a black ink may be contained in the water base ink set for ink-jet recording of the present invention.

The problem involved in the conventional technique is sufficiently solved in the water base ink set for ink-jet recording of the present invention obtained as described above. It is possible to provide the vivid color recording over a long term.

DESCRIPTION OF THE PREFERRED EMBODIMENTS

Figure 1:
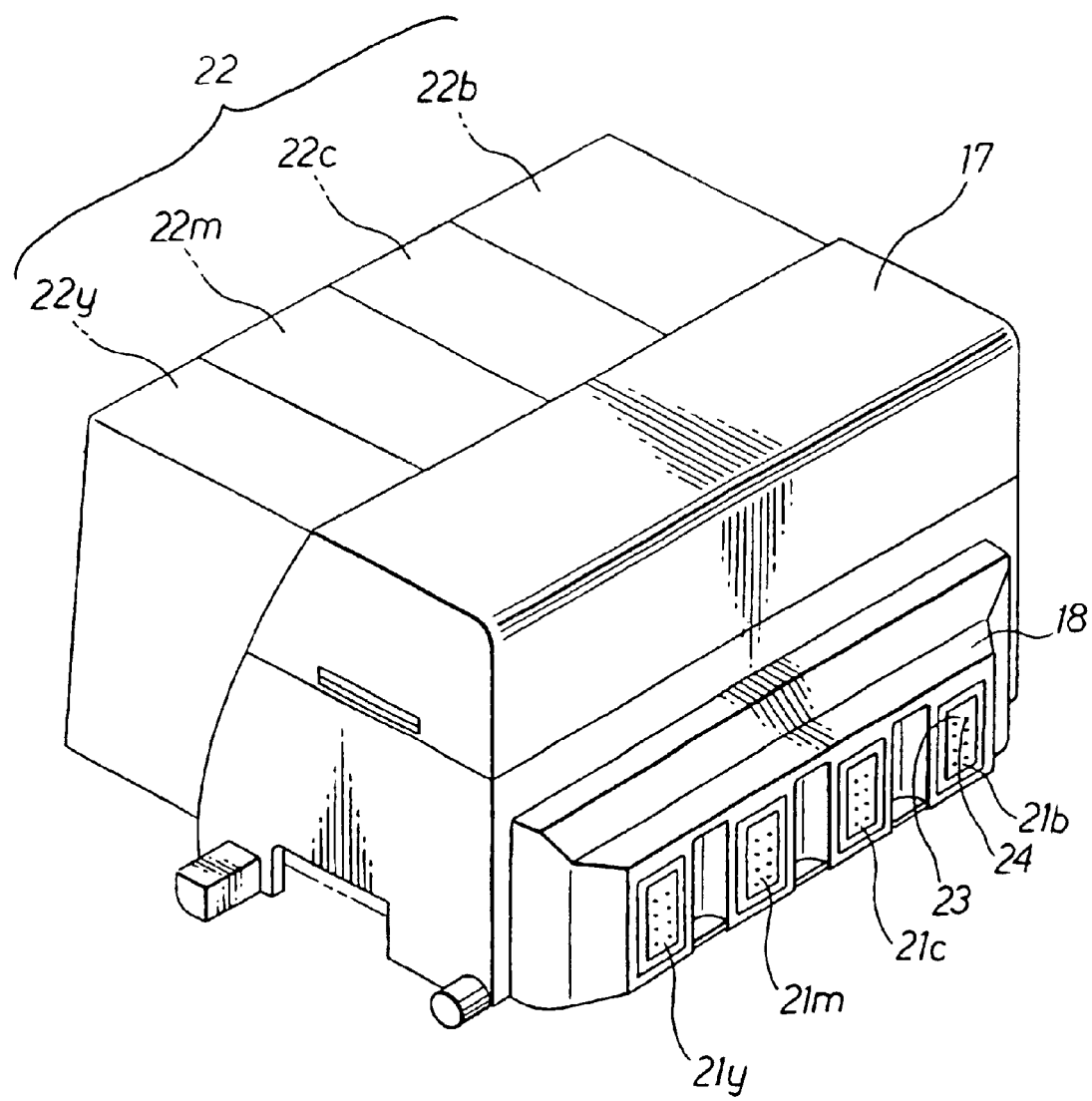
FIG. 1 shows an ink jet head which ejects four color inks and is provided with a color ink cartridge in accordance with the invention.

The present invention will be explained in further detail below as exemplified by embodiments. However, the present invention is not limited to only the embodiments.

A variety of inks having the following compositions were prepared. Numerical values are expressed by parts by weight.

| Composition 1, composition of yellow ink: | |
|---|---|
| C. I. Acid Yellow 23 | 0.5 |
| C. I. Direct Yellow 86 | 1.5 |
| Butyl triglycol | 4 |
| Glycerol | 25 |
| Pure water | balance |
| Total | 100 |

| Composition 2, composition of magenta ink: | |
|---|---|
| C. I. Direct Red 75 | 2 |
| Butyl triglycol | 4 |
| Glycerol | 25 |
| Pure water | balance |
| Total | 100 |

| Composition 3, composition of cyan ink: | |
|---|---|
| C. I. Reactive Blue 21 | 2 |
| Butyl triglycol | 4 |
| Glycerol | 25 |
| Pure water | balance |
| Total | 100 |

| Composition 4, composition of yellow ink: | |
|---|---|
| C. I. Acid Yellow 23 | 0.5 |
| C. I. Direct Yellow 132 | 1.5 |
| Butyl triglycol | 4 |
| Glycerol | 25 |
| Pure water | balance |
| Total | 100 |

| Composition 5, composition of cyan ink: | |
|---|---|
| C. I. Acid Blue 9 | 0.5 |
| C. I. Direct Blue 199 | 1.5 |
| Butyl triglycol | 4 |
| Glycerol | 25 |
| Pure water | balance |
| Total | 100 |

| Composition 6, composition of cyan ink: | |
|---|---|
| C. I. Direct Blue 199 | 1.5 |
| C. I. Reactive Blue 21 | 0.5 |
| Butyl triglycol | 4 |
| Glycerol | 25 |
| Pure water | balance |
| Total | 100 |

| Composition 7, composition of yellow ink: | |
|---|---|
| C. I. Acid Yellow 23 | 2 |
| Butyl triglycol | 4 |
| Glycerol | 25 |
| Pure water | balance |
| Total | 100 |

| Composition 8, composition of magenta ink: | |
|---|---|
| C. I. Reactive Red 180 | 2 |
| Butyl triglycol | 4 |
| Glycerol | 25 |
| Pure water | balance |
| Total | 100 |

| Composition 9, composition of cyan ink: | |
|---|---|
| C. I. Acid Blue 9 | 2 |
| Butyl triglycol | 4 |
| Glycerol | 25 |
| Pure water | balance |
| Total | 100 |

| Composition 10, composition of yellow ink: | |
|---|---|
| C. I. Direct Yellow 86 | 2 |
| Butyl triglycol | 4 |
| Glycerol | 25 |
| Pure water | balance |
| Total | 100 |

| Composition 11, composition of yellow ink: | |
|---|---|
| C. I. Acid Yellow 132 | 2 |
| Butyl triglycol | 4 |
| Glycerol | 25 |
| Pure water | balance |
| Total | 100 |

| Composition 12, composition of magenta ink: | |
|---|---|
| C. I. Acid Red 52 | 2 |
| Butyl triglycol | 4 |
| Glycerol | 25 |
| Pure water | balance |
| Total | 100 |

| Composition 13, composition of cyan ink: | |
|---|---|
| C. I. Direct Blue 199 | 2 |
| Butyl triglycol | 4 |
| Glycerol | 25 |
| Pure water | balance |
| Total | 100 |

The respective materials described above were sufficiently mixed and agitated for the inks of Compositions 1 to 13, followed by performing filtration with a membrane filter of 0.5 μm to use obtained inks for evaluating the recording therewith.

The obtained yellow inks, the magenta inks, and the cyan inks were subjected to the recording with the regular paper (Xerox 4200) by using MFC-7150C (ink-jet printer produced by BROTHER INDUSTRIES, LTD.). Portions, at which the coating rate was 100%, were used for recording samples.

Next, the light resistance test was performed as follows for the recording samples subjected to the recording, by using a strong energy xenon weather meter SC750-WN produced by Suga Test Instruments. The xenon lamp light beam was radiated for 30 hours at a radiation illuminance of 100 W/m² under conditions of a wavelength of 300 to 400 nm and a humidity of 50% Rh at a room temperature of 25° C. The colors before and after the test were measured with a spectrophotometric colorimetry meter, Minolta CM-2002 (light source: $D_{65}$, field: 2°). ΔE was determined in accordance with the following expression from changes of L*, a*, b* standardized by CIE (International Commission on Illumination) generally used to express the color. ΔE is used in a variety of fields as a parameter to evaluate the difference between two different colors. ΔE is herein used as a parameter for the light resistance.

$$\Delta E = \{(L^* - L^{*\prime})^2 + (a^* - a^{*\prime})^2 + (b^* - b^{*\prime})^2\}^{1/2}$$

L*: lightness before test, L*': lightness after test, a*: chromaticness in red-green direction before test, a*': chromaticness in red-green direction after test, b*: chromaticness in yellow-blue direction before test, b*': chromaticness in yellow-blue direction after test.

Table 1 shows light resistances of the inks having the respective compositions.

TABLE 1

|  | Light resistance (ΔE) |
| --- | --- |
| Composition 1 | 6.2 |
| Composition 2 | 9.4 |
| Composition 3 | 6.1 |
| Composition 4 | 5.8 |
| Composition 5 | 8.7 |
| Composition 6 | 5.5 |
| Composition 7 | 17 |
| Composition 8 | 17 |
| Composition 9 | 22 |
| Composition 10 | 3.7 |
| Composition 11 | 3.0 |
| Composition 12 | 66 |
| Composition 13 | 1.0 |

Tables 2A and 2B show ink sets in Examples 1 to 7, and Tables 3A and 3B show ink sets in Comparative Examples 1 to 6.

TABLE 2A

|  | Yellow ink | Magenta ink | Cyan ink |
| --- | --- | --- | --- |
| Example 1 | Composition 1 | Composition 2 | Composition 3 |
| Example 2 | Composition 1 | Composition 2 | Composition 5 |
| Example 3 | Composition 1 | Composition 2 | Composition 6 |
| Example 4 | Composition 4 | Composition 2 | Composition 3 |
| Example 5 | Composition 4 | Composition 2 | Composition 5 |
| Example 6 | Composition 4 | Composition 2 | Composition 6 |
| Example 7 | Composition 7 | Composition 8 | Composition 9 |

TABLE 2B

|  | $|\Delta E_Y - \Delta E_M|$ | $|\Delta E_M - \Delta E_C|$ | $|\Delta E_C - \Delta E_Y|$ |
| --- | --- | --- | --- |
| Example 1 | 3.2 | 3.3 | 0.1 |
| Example 2 | 3.2 | 0.7 | 1.5 |
| Example 3 | 3.2 | 3.9 | 0.7 |
| Example 4 | 3.6 | 3.3 | 0.3 |
| Example 5 | 3.6 | 0.7 | 2.9 |
| Example 6 | 3.6 | 3.9 | 0.3 |
| Example 7 | 0.0 | 5.0 | 5.0 |

TABLE 3A

|  | Yellow ink | Magenta ink | Cyan ink |
| --- | --- | --- | --- |
| Com. Ex. 1 | Composition 7 | Composition 12 | Composition 9 |
| Com. Ex. 2 | Composition 7 | Composition 12 | Composition 13 |
| Com. Ex. 3 | Composition 10 | Composition 12 | Composition 9 |
| Com. Ex. 4 | Composition 10 | Composition 12 | Composition 13 |
| Com. Ex. 5 | Composition 11 | Composition 8 | Composition 9 |
| Com. Ex. 6 | Composition 11 | Composition 8 | Composition 13 |

TABLE 3B

|  | $|\Delta E_Y - \Delta E_M|$ | $|\Delta E_M - \Delta E_C|$ | $|\Delta E_C - \Delta E_Y|$ |
| --- | --- | --- | --- |
| Com. Ex. 1 | 49.0 | 44.0 | 5.0 |
| Com. Ex. 2 | 49.0 | 65.0 | 16.0 |
| Com. Ex. 3 | 62.3 | 44.0 | 18.3 |
| Com. Ex. 4 | 62.3 | 65.0 | 2.7 |

TABLE 3B-continued

|  | $|\Delta E_Y - \Delta E_M|$ | $|\Delta E_M - \Delta E_C|$ | $|\Delta E_C - \Delta E_Y|$ |
| --- | --- | --- | --- |
| Com. Ex. 5 | 14.0 | 5.0 | 19.0 |
| Com. Ex. 6 | 14.0 | 16.0 | 2.0 |

The printing was performed on the regular paper by using the ink sets prepared in Examples 1 to 7 and Comparative Examples 1 to 6 to prepare recording samples. Subsequently, the light resistance test was performed for the recording samples, by using a strong energy xenon weather meter SC750-WN produced by Suga Test Instruments. The xenon lamp light beam was radiated for 30 hours at a radiation illuminance of 100 W/m² under conditions of a wavelength of 300 to 400 nm and a humidity of 50% Rh at a room temperature of 25° C. The fading was evaluated by visual observation for the recording samples after the test. Results are shown in Tables 4 and 5.

TABLE 4

|  | Evaluation | Note |
| --- | --- | --- |
| Example 1 | ++ | relatively good light resistance, with fading while maintaining color balance |
| Example 2 | ++ | relatively good light resistance, with fading while maintaining color balance |
| Example 3 | ++ | relatively good light resistance, with fading while maintaining color balance |
| Example 4 | ++ | relatively good light resistance, with fading while maintaining color balance |
| Example 5 | ++ | relatively good light resistance, with fading while maintaining color balance |
| Example 6 | ++ | relatively good light resistance, with fading while maintaining color balance |
| Example 7 | + | with fading while maintaining color balance |

TABLE 5

|  | Evaluation | Note |
| --- | --- | --- |
| Com. Ex. 1 | ± | with fading as a whole especially with weak red |
| Com. Ex. 2 | ± | with weak read and strong blue |
| Com. Ex. 3 | ± | with weak read and strong yellow |
| Com. Ex. 4 | ± | with strong yellow and strong blue |
| Com. Ex. 5 | ± | with weak read and strong yellow |
| Com. Ex. 6 | ± | with strong yellow and strong blue |

In Example 7, the color balance was established even after the test, with no change into any unnatural image. Further, in each of Examples 1 to 6, the light resistance was also excellent as a whole. On the other hand, in each of Comparative Example 1 to 6, the color balance was deficient, with the change into an unnatural image.

An embodiment of an ink cartridge which contains the water base ink or water base ink set in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

The present invention has been constructed as described above. Therefore, according to the present invention, it is possible to obtain an image in which the balance is established even after the time-dependent change caused by light, and it is possible to obtain an image in which the light resistance is excellent as a whole.

What is claimed is:

1. An ink set for ink-jet recording comprising:

a yellow ink, a magenta ink, and a cyan ink, wherein:

changes of colors $\Delta E_Y$, $\Delta E_M$, $\Delta E_C$ of the yellow ink, the magenta ink, and the cyan ink satisfy the following relationship when the yellow ink, the magenta ink, and the cyan ink are deposited on regular paper, followed by being irradiated with light having a wavelength of 300 nm to 400 nm and an illuminance of 100 W/m² for 30 hours by using a xenon lamp:

$|\Delta E_Y - \Delta E_M| \leq 5$, $|\Delta E_M - \Delta E_C| \leq 5$, $|\Delta E_C - \Delta E_Y| \leq 5$;

wherein:

the changes of colors $\Delta E_Y$, $\Delta E_M$, $\Delta E_C$ of the yellow ink, the magenta ink, and the cyan ink are not less than 5 respectively; and each of the yellow ink, the magenta ink, and the cyan ink contains water, a coloring agent, and a water-soluble organic solvent.

2. The ink set according to claim 1, wherein the changes of colors $\Delta E_Y$, $\Delta E_M$, $\Delta E_C$ of the yellow ink, the magenta ink, and the cyan ink satisfy $|\Delta E_Y - \Delta E_M| \leq 4$, $|\Delta E_M - \Delta E_C| \leq 4$, $|\Delta E_C - \Delta E_Y| \leq 4$.

3. The ink set according to claim 1, wherein the changes of colors $\Delta E_Y$, $\Delta E_M$, $\Delta E_C$ of the yellow ink, the magenta ink, and the cyan ink are not more than 10 respectively.

4. The ink set according to claim 1, wherein the ink set is accommodated in a cartridge.

5. The ink set according to claim 4, wherein the cartridge includes compartments which accommodate the yellow ink, the magenta ink, and the cyan ink respectively.

* * * * *

UNITED STATES PATENT AND TRADEMARK OFFICE
CERTIFICATE OF CORRECTION

PATENT NO.   : 6,790,266 B2
DATED        : September 14, 2004
INVENTOR(S)  : Narumi Koga et al.

It is certified that error appears in the above-identified patent and that said Letters Patent is hereby corrected as shown below:

<u>Column 9,</u>
Line 18, should read -- $|\Delta E_Y - \Delta E_M| \leq 5$, $|\Delta E_M - \Delta E_C| \leq 5$, $|\Delta E_C - \Delta E_Y| \leq 5$; --

Signed and Sealed this

Eleventh Day of January, 2005

JON W. DUDAS
*Director of the United States Patent and Trademark Office*